(12) United States Patent
Saito

(10) Patent No.: US 9,687,900 B2
(45) Date of Patent: Jun. 27, 2017

(54) METHOD FOR WORKING STEEL SHEET, AND APPARATUS FOR WORKING STEEL SHEET

(71) Applicant: TOYOTA JIDOSHA KABUSHIKI KAISHA, Toyota-shi, Aichi (JP)

(72) Inventor: Kazumi Saito, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/646,862

(22) PCT Filed: Nov. 30, 2012

(86) PCT No.: PCT/JP2012/081177
§ 371 (c)(1),
(2) Date: May 22, 2015

(87) PCT Pub. No.: WO2014/083701
PCT Pub. Date: Jun. 5, 2014

(65) Prior Publication Data
US 2015/0273559 A1    Oct. 1, 2015

(51) Int. Cl.
*B21D 22/22* (2006.01)
*B23D 27/00* (2006.01)
(Continued)

(52) U.S. Cl.
CPC ............ *B21D 24/16* (2013.01); *B21D 22/22* (2013.01); *B21D 35/001* (2013.01); *B23D 27/00* (2013.01)

(58) Field of Classification Search
CPC ......... B21D 24/16; B21D 22/22; B23D 27/00
See application file for complete search history.

(56) References Cited

U.S. PATENT DOCUMENTS 3,847,049 A    11/1974 Bitzel
6,047,583 A *  4/2000 Schroth ............... B21D 26/055
72/350
(Continued)

FOREIGN PATENT DOCUMENTS

DE    102010021330    *  1/2011    ............. B21D 22/22
JP    H02-108521 U    8/1990
(Continued)

OTHER PUBLICATIONS

Machine Translation of Mayer et al. (DE 10 2010 021 330 A1), 4 pages, translation obtained on Jun. 21, 2016.*

*Primary Examiner* — Teresa M Ekiert
(74) *Attorney, Agent, or Firm* — Andrews Kurth Kenyon LLP

(57) ABSTRACT

Provided is a technique capable of inexpensively working a steel sheet. A method for working a workpiece with an apparatus for working a workpiece, includes: a drawing step for performing drawing with a drawing device having an upper die and a lower die; and a cutting step for cutting the drawn workpiece with a cutting device having nibblers. The nibbler has a cylindrical case, a punch housed in the case, which reciprocates in a top-bottom direction to punch the workpiece, and a die arranged below the case, the die having a die hole into which the punch enters, and an ejecting hole communicating with the die hole, through which a scrap is ejected. The nibbler trims the workpiece fed between the case and the die.

8 Claims, 19 Drawing Sheets

(51) Int. Cl.
*B21D 35/00* (2006.01)
*B21D 24/16* (2006.01)

(56) References Cited

U.S. PATENT DOCUMENTS

| | | | |
|---|---|---|---|
| 6,530,255 B1 | 3/2003 | Usui et al. | |
| 7,322,222 B2* | 1/2008 | Kodaka | B21D 24/04 72/309 |
| 2010/0175447 A1* | 7/2010 | Golovashchenko | B21D 24/16 72/55 |
| 2012/0210764 A1* | 8/2012 | Moore | B21D 22/22 72/338 |
| 2012/0279272 A1* | 11/2012 | Zhou | B21D 22/22 72/350 |

FOREIGN PATENT DOCUMENTS

| | | |
|---|---|---|
| JP | H03-47635 A | 2/1991 |
| JP | H07-1048 A | 1/1995 |
| JP | 2000-079424 A | 3/2000 |
| JP | 2000-351024 A | 12/2000 |
| JP | 3685961 B2 | 8/2005 |
| JP | 2012-115866 A | 6/2012 |

* cited by examiner

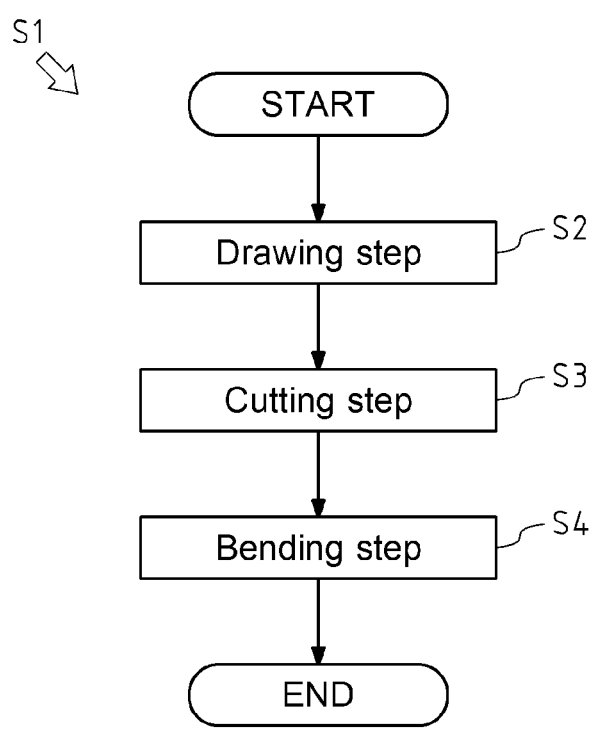

FIG. 7
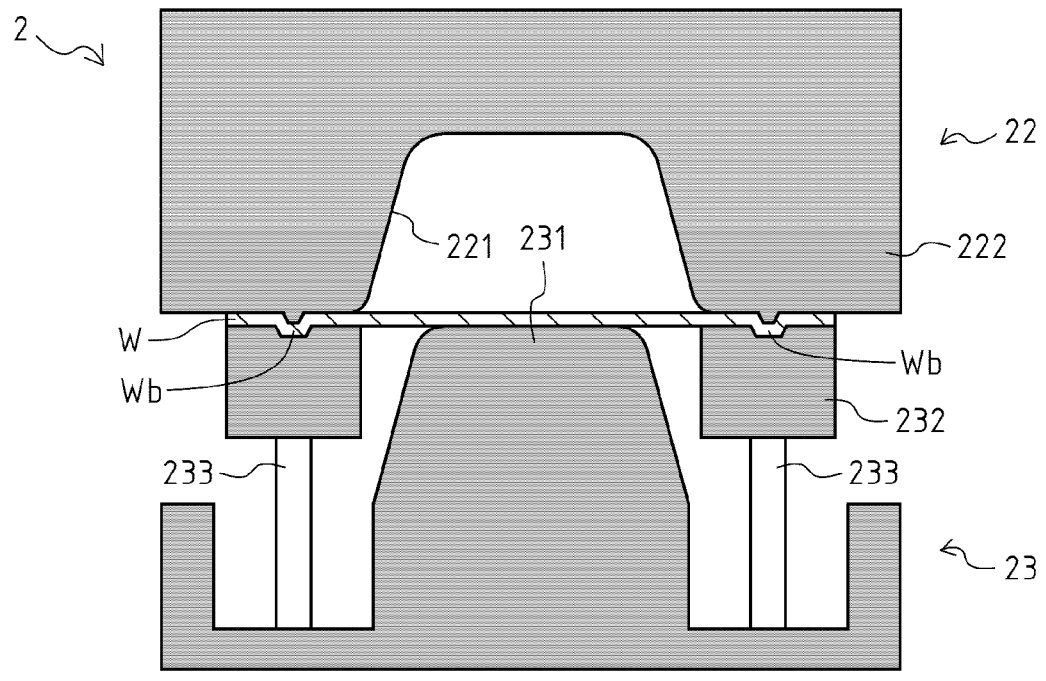
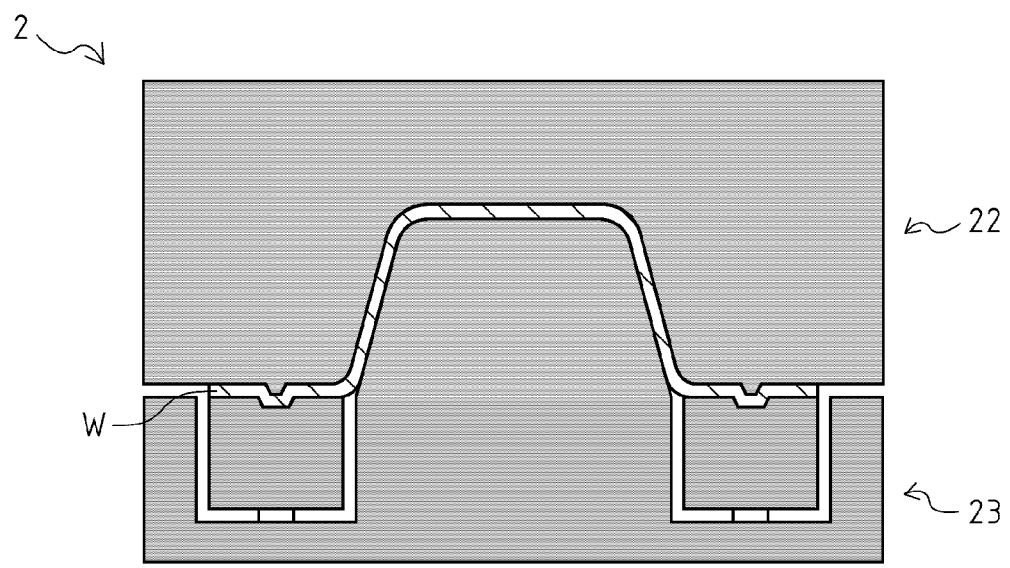

METHOD FOR WORKING STEEL SHEET, AND APPARATUS FOR WORKING STEEL SHEET

CROSS-REFERENCE TO RELATED APPLICATION

This is a national phase application based on the PCT International Patent Application No. PCT/JP2012/081177 filed Nov. 30, 2012, the entire contents of which are incorporated herein by reference.

TECHNICAL FIELD

The present invention relates to a method and an apparatus for working a steel sheet into a predetermined shape.

BACKGROUND ART

Conventionally, when a steel sheet is worked, a pressing machine is used which is provided with plural pairs of dies having different uses.

For example, JP Pat. No. 3685961 discloses a pressing machine provided with a pair of dies for trimming a drawn steel sheet, a pair of dies for roughly bending the trimmed steel sheet, and a pair of dies for finally bending the roughly bent steel sheet.

The pressing machine can work a plurality of (three) steel sheets existing in different states at the same time.

However, the above-mentioned pressing machine needs an extremely large load for pressing because the plural pairs of dies works the plurality of steel sheets at the same time, which causes a problem of an increase in size of the pressing machine, for example.

JP-A 2000-79424 discloses a technique including drawing a steel sheet with a pressing machine provided with upper and lower dies, trimming the drawn steel sheet with a laser cutter attached to a robot arm, and bending the trimmed steel sheet with a roller attached to the robot arm.

However, adopting the laser cutter needs a high equipment investment because the laser cutter is expensive. Therefore, the technique disclosed in JP-A 2000-79424 has a disadvantage of increase in cost required to trim the steel sheet with the laser cutter.

CITATION LIST

Patent Literature

PTL1: JP Pat. No. 3685961
PTL2: JP-A 2000-79424

SUMMARY OF INVENTION

Technical Problem

The object of the present invention is to provide a technique capable of inexpensively working a steel sheet.

Solution to Problem

A first aspect of the invention is a method for working a steel sheet into a predetermined shape, including: a drawing step for drawing the steel sheet using at least one pair of dies; and a cutting step for cutting the steel sheet drawn in the drawing step using at least one nibbler. The nibbler has a cylindrical case, a punch housed in the case, which reciprocates in a top-bottom direction to punch the steel sheet, and a die arranged below the case so as to be on the opposite side of the case across the steel sheet, the die having a die hole into which the punch enters, and an ejecting hole communicating with the die hole, through which a scrap punched from the steel sheet is ejected. In the cutting step, while moving the nibbler, the steel sheet fed between the case and the die is continuously punched by the punch to cut the steel sheet.

Preferably, in the drawing step, a bead protruding toward a side where one of both surfaces of the steel sheet is situated is formed in a ring on a peripheral part of the steel sheet over the whole circumference of the peripheral part. A low part having a height smaller than the shortest distance between the case and the die of the nibbler is formed in at least one part of the bead. In the cutting step, a part of the peripheral part including the bead is cut out by moving the nibbler over the low part from a periphery of the steel sheet to a part of the steel sheet situated inward from the bead.

Preferably, the low part of the bead is formed flush with the surface of the steel sheet.

Preferably, in the drawing step, a bead protruding toward a side where one of both surfaces of the steel sheet is situated is formed on a peripheral part of the steel sheet over the whole circumference of the peripheral part. The bead is cut off in at least one part thereof, and one section and the other section of the part where the bead is cut off is arranged at an interval in an inward-outward direction of the steel sheet to form a gap therebetween through which the nibbler passes. In the cutting step, the nibbler is moved to a part of the steel sheet situated inward from the bead through the gap to cut out a part of the peripheral part including the bead.

Preferably, in the drawing step, a bead protruding toward a side where one of both surfaces of the steel sheet is situated is continuously formed in a ring on a peripheral part of the steel sheet over the whole circumference of the peripheral part. In the cutting step, the steel sheet is milled from a periphery of the steel sheet to a part of the steel sheet situated inward from the bead, and then the nibbler is entered into the milled part of the steel sheet to cut out a part of the peripheral part including the bead.

Preferably, in the drawing step, a bead protruding toward a side where one of both surfaces of the steel sheet is situated is continuously formed in a ring on a peripheral part of the steel sheet over the whole circumference of the peripheral part. In the cutting step, at least one of the bead is pressed to make a height thereof smaller than the shortest distance between the case and the die of the nibbler, and then the nibbler is moved over the pressed part of the bead from a periphery of the steel sheet to a part of the steel sheet situated inward from the bead to cut out a part of the peripheral part including the bead.

Preferably, in the drawing step, a bead protruding toward a side where one of both surfaces of the steel sheet is situated is continuously formed in a ring on a peripheral part of the steel sheet over the whole circumference of the peripheral part, and a slit part to be bent toward a side where one of both the surfaces of the steel sheet is situated is formed by providing a slit penetrating through the steel sheet in the part of the steel sheet situated inward from the bead. In the cutting step, a through hole into which the nibbler is inserted is formed in the steel sheet by bending the slit part toward a side where one of both the surfaces of the steel sheet is situated, and then the nibbler is inserted into the through hole to cut out a part of the peripheral part including the bead.

Preferably, the method further includes a bending step for bending the steel sheet cut in the cutting step.

A second aspect of the invention is an apparatus for working a steel sheet into a predetermined shape, including: a drawing device having at least one pair of dies, which draws the steel sheet; a cutting device having at least one nibbler, which cuts the steel sheet drawn by the drawing device; and a bending device which bends the steel sheet cut by the cutting device. The nibbler includes: a cylindrical case; a punch housed in the case, which reciprocates in a top-bottom direction to punch the steel sheet; and a die arranged below the case so as to be on the opposite side of the case across the steel sheet, the die having a die hole into which the punch enters, and an ejecting hole communicating with the die hole, through which a scrap punched from the steel sheet is ejected. The nibbler makes the punch continuously punch the steel sheet fed between the case and the die while moving, thereby cutting the steel sheet.

Advantageous Effects of Invention

The present invention makes it possible to inexpensively work a steel sheet.

BRIEF DESCRIPTION OF DRAWINGS

FIG. 5A is a sectional view, and FIG. 5B is an end view taken along line A-A in FIG. 5A.

FIG. 6 shows a step for working the steel sheet with the apparatus according to the first embodiment of the present invention.

FIG. 7 shows a drawing step.

DESCRIPTION OF EMBODIMENTS

[First embodiment]

Figure 1:
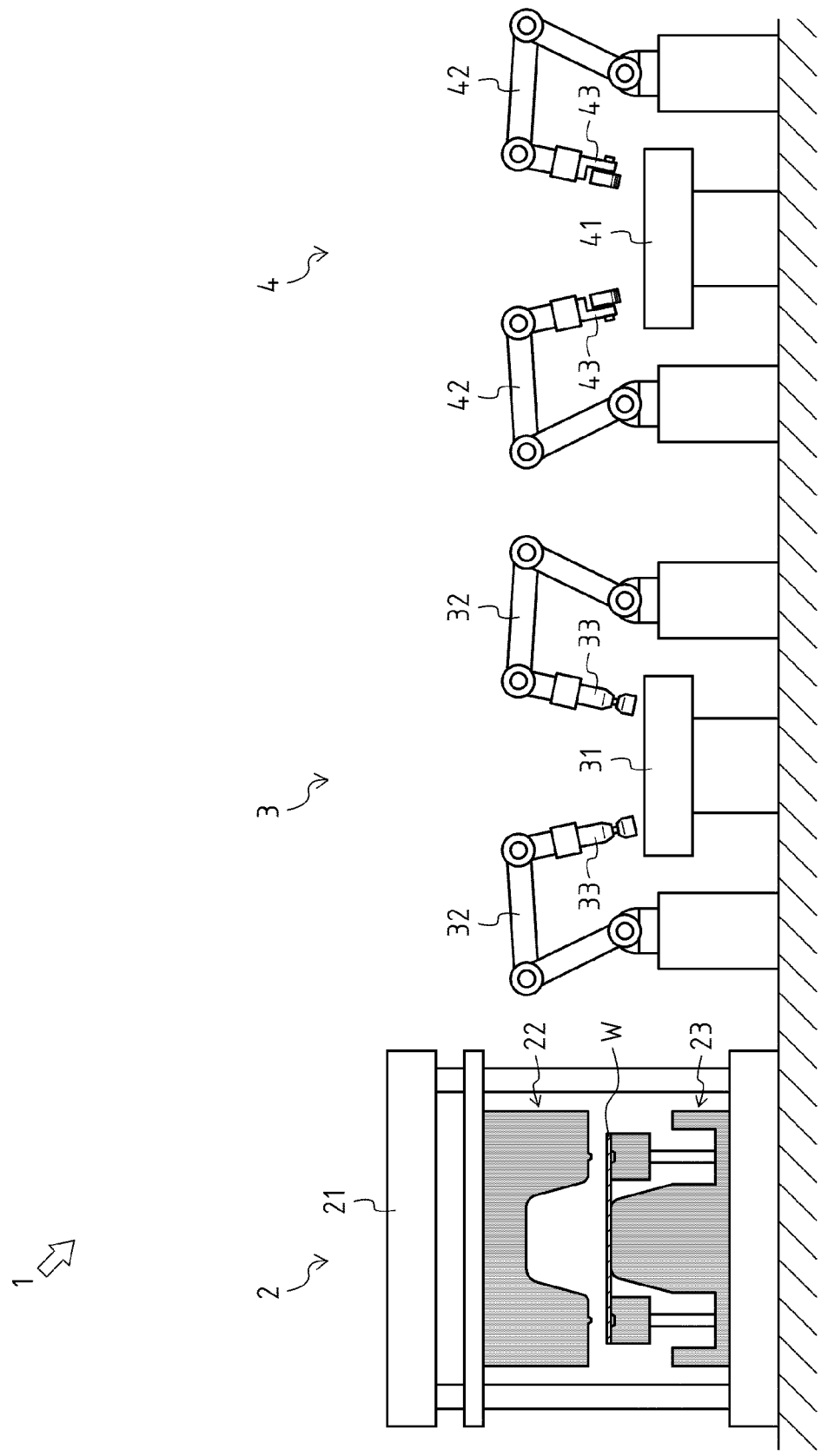
FIG. 1 shows an apparatus for working a steel sheet according to a first embodiment of the present invention.

With reference to FIGS. 1 and 5, an apparatus 1 as a first embodiment of an apparatus for working a steel sheet according to the present invention is described below.

The apparatus 1 works a workpiece W which is a steel sheet into a predetermined shape.

For convenience, a top-bottom direction in FIG. 1 is defined as a top-bottom direction of the apparatus 1.

As shown in FIG. 1, the apparatus 1 includes a drawing device 2, a cutting device 3, and a bending device 4.

The drawing device 2 has a pressing machine 21, and upper and lower dies 22 and 23. The drawing device 2 is configured to draw the workpiece W.

The pressing machine 21 is configured so that the upper and lower dies 22 and 23 are attached thereto, and that the upper die 22 moves into and out of proximity with the lower die 23.

The upper and lower dies 22 and 23 constitute a pair of dies attached to the pressing machine 21, and are arranged above and below the pressing machine 21, respectively. The upper and lower dies 22 and 23 draw the workpiece W placed therebetween when the pressing machine 21 brings the upper die 22 into proximity with the lower die 23.

Figure 2:
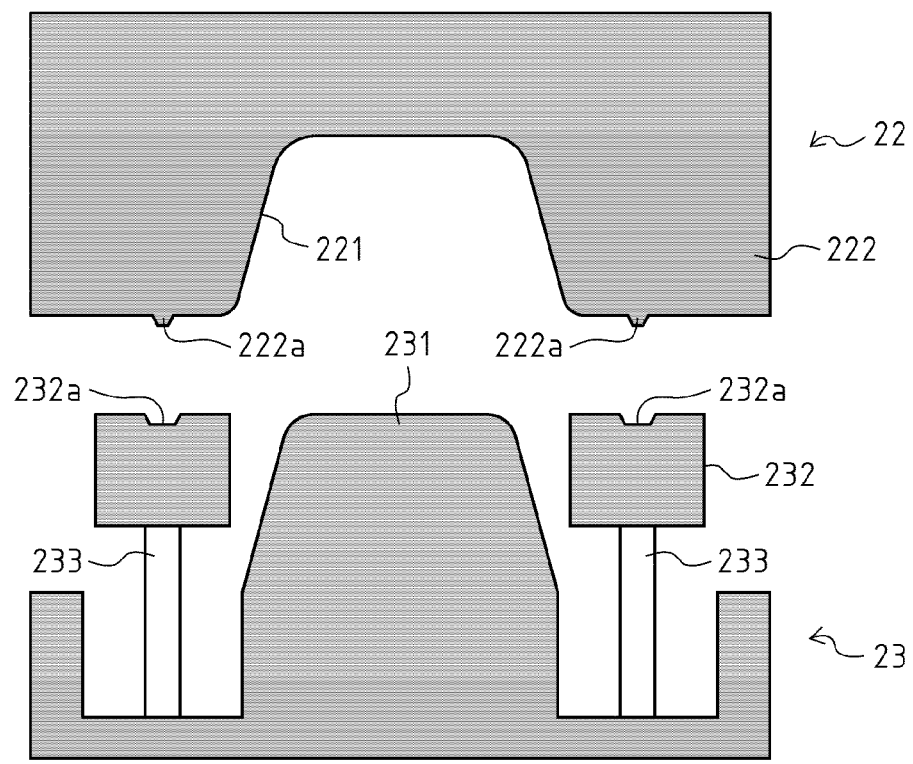
FIG. 2 shows a drawing device of the apparatus for working the steel sheet.

As shown in FIG. 2, the upper die 22 has a die hole 221 and a die part 222.

The die hole 221 is formed so that the lower surface of the upper die 22 is upward recessed. The die hole 221 is formed to coincide in shape with an after-mentioned punch part 231 of the lower die 23.

The die part 222, together with the punch part 231 of the lower die 23, draws the workpiece W. The die part 222 is formed to surround the die hole 221. In other words, the die part 222 corresponds to the part of the upper die 22 where the die hole 221 is not formed.

On the lower surface of the die part 222, a wrinkle-preventing surface for holding the peripheral part of the workpiece W is formed. On the wrinkle-preventing surface of the die part 222, a plurality of protrusions 222a are formed to protrude downward, inhibiting the inflow (movement toward the die hole 221) of the workpiece W during the drawing of the workpiece W. Each of the protrusions 222a is formed in substantially a trapezoid when seen in a sectional view.

Figure 3:
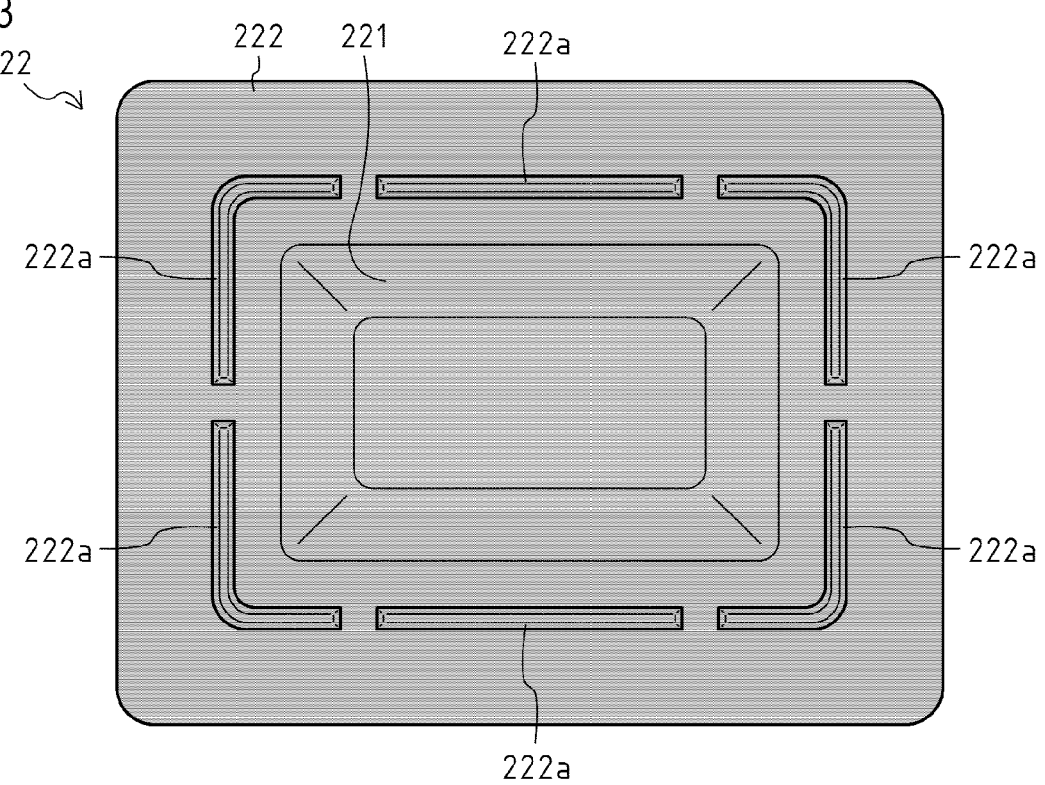
FIG. 3 is a bottom view showing protrusions formed on an upper die of the drawing device.

As shown in FIG. 3, the plurality of protrusions 222a are formed on the wrinkle-preventing surface of the die part 222 to surround the die hole 221 along the shape of the die hole 221, and adjacent protrusions 222a are arranged at a predetermined interval. In short, the protrusions 222a are intermittently formed to surround the die hole 221. In other words, the plurality of protrusions 222a are formed in a shape obtained by removing a plurality of parts of one protrusion which is continuously formed to circle the die hole 221 from a predetermined position of the wrinkle-preventing surface of the die part 222 to the predetermined position.

In the present embodiment, the die hole 221 is formed in substantially a rectangle when seen in a bottom view, and six protrusions 222a are formed in substantially a rectangle when seen in a bottom view to surround the die hole 221.

In the present embodiment, the pressing machine 21 to which the pair of dies (the upper and lower dies 22 and 23)

is attached is used. However, a multiplaten pressing machine to which a plurality of dies are vertically attached may be used.

As shown in FIG. 2, the lower die 23 has the punch part 231 and a blank holder 232.

The punch part 231 is formed to protrude toward the die hole 221 of the upper die 22. The punch part 231 is formed to coincide in shape with the die hole 221 of the upper die 22. The punch part 231, together with the die part 222 of the upper die 22, draws the workpiece W.

The blank holder 232, together with the die part 222 of the upper die 22, holds the peripheral part of the workpiece W therebetween. The blank holder 232 is arranged to surround the punch part 231. In other words, a through hole through which the punch part 231 passes is formed in the blank holder 232 to coincide in shape with the punch part 231 so as to come out of contact with the punch part 231 (see FIG. 4). The blank holder 232 is upward biased by a predetermined biasing means through a plurality of cushion pins 233. The blank holder 232 moves downward when load against the biasing force is applied thereto. During no application of the load, the blank holder 232 stays at the same height as the upper surface of the punch part 231 or above the upper surface of the punch part 231.

The cushion pin 233 is a bar extending in the top-bottom direction. The upper end part of the cushion pin 233 is fixed to the blank holder 232, and the lower end part of the cushion pin 233 is fixed to the biasing means.

Moreover, the upper surface of the blank holder 232 corresponds to the wrinkle-preventing surface of the die part 222. On the upper surface of the blank holder 232, a plurality of recesses 232a corresponding to the plurality of protrusions 222a of the die part 222 of the upper die 22 are formed to downward cave in. Each of the recesses 232a is formed to coincide in shape with the corresponding protrusion 222a. In other words, each of the recesses 232a is formed in substantially a trapezoid when seen in a sectional view.

Figure 4:
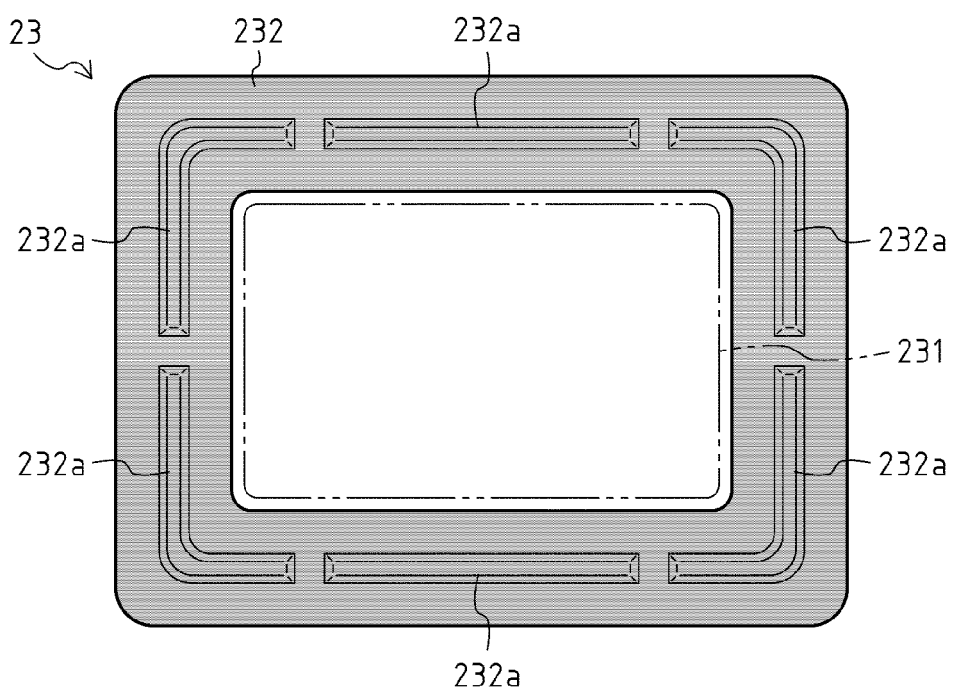
FIG. 4 is a plan view showing recesses formed on a lower die of the drawing device.

As shown in FIG. 4, the plurality of recesses 232a are formed to coincide in position with the plurality of protrusions 222a. Specifically, the plurality of recesses 232a are formed on the upper surface of the blank holder 232 to surround the through hole of the blank holder 232 along the shape of the through hole, and adjacent recesses 232a are arranged at a predetermined interval. In short, the recesses 232a are intermittently formed to surround the through hole. In other words, the plurality of recesses 232a are formed in a shape obtained by removing a plurality of parts of one recess which is continuously formed to circle the through hole from a predetermined position of the upper surface of the blank holder 232 to the predetermined position.

In the present embodiment, the punch part 231 and the through hole of the blank holder 232 are each formed in substantially a rectangle, and six recesses 232a are formed in substantially a rectangle when seen in a plan view to surround the through hole.

As shown in FIG. 1, the cutting device 3 has a lower die 31, two robots 32, and two nibblers 33. The cutting device 3 cuts the workpiece W drawn by the drawing device 2.

The lower die 31 is a member on which the workpiece W drawn by the drawing device 2 is placed.

The robot 32 has an arm with multiple joints, and is configured to change a position and a posture of the arm. The nibbler 33 for removing (trimming) an unnecessary part of the peripheral part of the workpiece W placed on the lower die 31 is attached to the tip of the arm of the robot 32.

The number of robots 32 is not limited as long as at least one robot 32 to which the nibbler 33 is attached is provided.

In the case of providing two or more robots 32, the nibbler 33 is required to be attached to at least one robot 32.

Figure 5A:
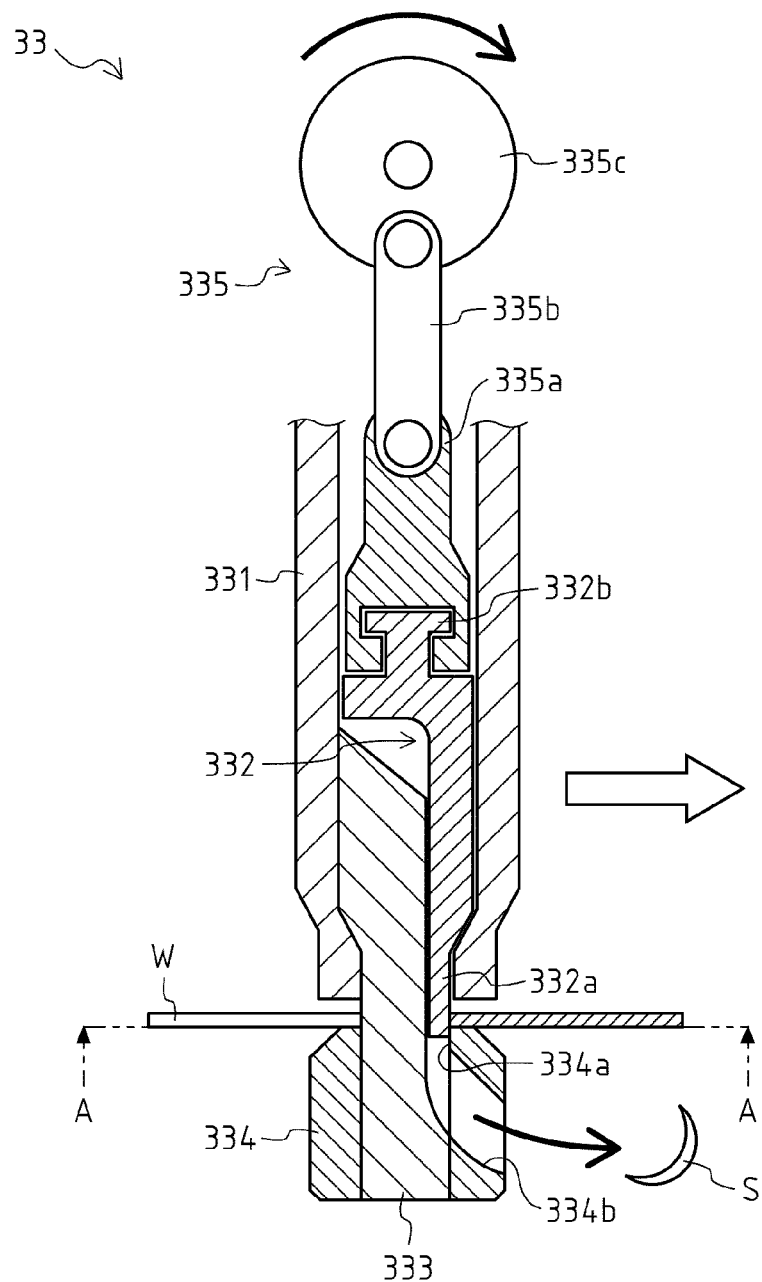
FIGS. 5A and 5B show a nibbler provided in a cutting device of the apparatus.
Figure 5B:
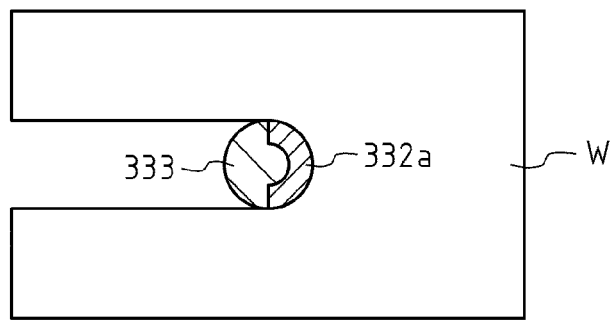

As shown in FIGS. 5A and 5B, the nibbler 33 is a device which continuously punches the workpiece W while moving. The nibbler 33 has a case 331, a punch 332, a supporting part 333, a die 334, and a driving part 335.

For convenience, a top-bottom direction in FIG. 5A is defined as a top-bottom direction of the nibbler 33.

The case 331 is formed in substantially a cylinder extending in the top-bottom direction, and the lower end part thereof is open.

The punch 332 is housed in the case 331 so as to slide in the top-bottom direction.

The supporting part 333 is fixed to the inner circumferential surface of the case 331, and supports the case 331 and the die 334.

The punch 332 reciprocates in the top-bottom direction, and punches the workpiece W. The punch 332 has a blade 332a, and a connecting part 332b.

The blade 332a has a sectional shape of substantially a horseshoe, and the lower end thereof is formed as a blade edge for punching the workpiece W. The blade 332a protrudes downward from the lower end of the case 331 to enter an after-mentioned die hole 334a of the die 334 when the punch 332 arrives at the bottom dead center.

The connecting part 332b is connected to the driving part 335 so that the driving part 335 reciprocates the punch 332 in the top-bottom direction.

The supporting part 333 is a member which supports the case 331 and the die 334. The upper end part of the supporting part 333 is fixed to the inner circumferential surface of the case 331, and the supporting part 333 extends downward from the inside of the case 331. The supporting part 333 has such a shape that an opening coincident with the sectional shape of the blade 332a is formed on the lower end surface of the case 331. In other words, a space in which the punch 332 is housed is formed between the case 31 and a part of the supporting part 333 inserted into the case 331, and the opening of the space formed on the lower end surface of the case 331 has the shape coincident with the sectional shape of the blade 332a.

The die 334 is fixed to the lower end part of the supporting part 333.

The die 334 is arranged below the case 331 so as to be on the opposite side of the case 331 across the workpiece W. The die 334 is formed in substantially a cylinder. The die 334 is fixed to the supporting part 333 so as to cover the lower end part of the supporting part 333. The die 334 has the die hole 334a, and an ejecting hole 334b.

The die hole 334a is formed so that the blade 332a enters the die hole 334a when the punch 332 arrives at the bottom dead center. Specifically, the die hole 334a is formed between the die 334 and a part of the supporting part 333 inserted into the die 334. The die hole 334a has the shape coincident with the sectional shape of the blade 332a, and opens on the upper end surface of the die 334.

The ejecting hole 334b is a hole through which a crescentic scrap S punched from the workpiece W by the punch 332 is ejected to the outside of the die 334. The ejecting hole 334b is formed on the lateral surface of the die 334, and communicates with the die hole 334a.

The driving part 335 reciprocates the punch 332 in the top-bottom direction. The driving part 335 has a connecting part 335a, a rod 335b, and a motor 335c.

The connecting part 335a is connected to the connecting part 332b of the punch 332.

The rod 335b is connected to the motor 335c and the connecting part 335a so as to transmit power of the motor 335c to the connecting part 335a.

The motor 335c transmits power to the connecting part 335a through the rod 335b. Revolution of the motor 335c is converted into vertical movement of the connecting part 335a through the rod 335b.

As mentioned above, the nibbler 33 makes the punch 332 reciprocate in the top-bottom direction (direction in which the punch 332 moves into and out of proximity with the die 334) while moving in a predetermined direction with the workpiece W interposed between the case 331 and the die 334, thereby continuously punching the workpiece W.

Moreover, using the nibbler 33 makes it possible to trim the workpiece W inexpensively compared with a case of using a laser cutter.

If the workpiece W is trimmed by an end mill, the end mill is worn away in a short period, which results in an increase of cost required to trim the workpiece W. However, if the nibbler 33 is used, the cost required to trim the workpiece W can be reduced because the punch 332 is relatively hard to be worn away and is inexpensive.

Moreover, in the nibbler 33, the die 334 is configured so that the scrap S is ejected from the ejecting hole 334b through the die hole 334a. In other words, the scrap S is ejected below the workpiece W.

This makes it possible to prevent the scrap S from cling to the workpiece W, and consequently to cut the workpiece W suitably.

As shown in FIG. 1, the bending device 4 has a lower die 41, two robots 42, and two bending rollers 43. The bending device 4 bends the workpiece W cut by the cutting device 3.

The lower die 41 is a member on which the workpiece W cut by the cutting device 3.

The robot 42 is substantially similar in structure to the robot 32. The bending roller 43 for bending the workpiece W placed on the lower die 41 is attached to the tip of the arm of the robot 42.

The number of robots 42 is not limited as long as at least one robot 42 to which the bending roller 43 is attached is provided.

In the case of providing two or more robots 42, the bending roller 43 is required to be attached to at least one robot 42.

The bending roller 43 rolls while pressing a predetermined part of the workpiece W placed on the lower die 41, thereby bending the workpiece W.

The shape of the bending roller 43 is not limited, and the bending roller 43 may be formed in a shape corresponding to a part of the workpiece W to be worked.

Moreover, a plurality of rollers having different uses may be provided to one robot 42.

Figure 13:
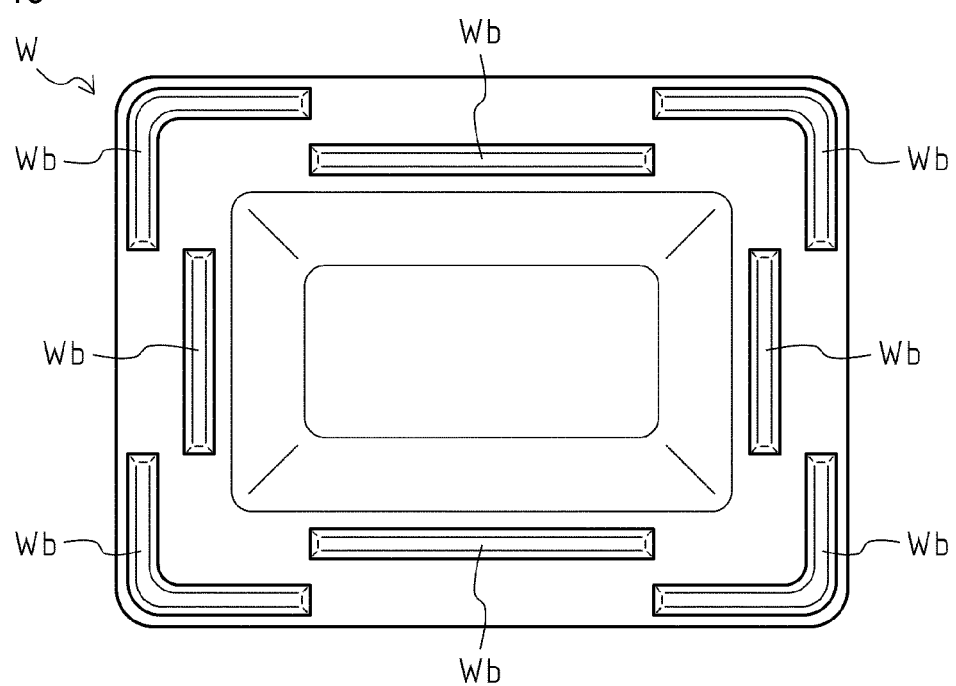
FIG. 13 shows a plurality of beads formed on the peripheral part of the steel sheet over the whole circumference thereof so that adjacent beads of the plurality of beads are separated from each other in the inward-outward direction of the steel sheet.

With reference to FIGS. 6 and 13, a step S1 for working a steel sheet using the apparatus 1 is described below.

As shown in FIG. 6, the step S1 includes a drawing step S2, a cutting step S3, and a bending step S4.

The drawing step S2 is a step for drawing the workpiece W with the drawing device 2.

As shown in FIG. 7, in the drawing step S2, first, the workpiece W is arranged between the upper and lower dies 22 and 23, and after that, the upper die 22 is lowered toward the lower die 23 so that the peripheral part of the workpiece W is pressed by the die part 222 of the upper die 22 and the blank holder 232 of the lower die 23.

Then, the upper die 22 is lowered to the bottom dead center against the biasing force of the biasing means which upward biases the blank holder 232 through the plurality of cushion pins 233, and thereby the workpiece W is formed to coincide in shape with the punch part 231 of the lower die 23.

Thus, the peripheral part of the workpiece W is held by the die part 222 and the blank holder 232, and then the workpiece W is drawn by the punch part 231.

As mentioned previously, the plurality of protrusions 222a and the plurality of recesses 232a are formed on the die part 222 and the blank holder 232, respectively (see FIGS. 3 and 4).

Therefore, when the peripheral part of the workpiece W is pressed by the die part 222 and the blank holder 232, a plurality of beads Wb protruding downward are formed on the peripheral part of the workpiece W to coincide in shape with the plurality of protrusions 222a and the plurality of recesses 232a.

Thus, the plurality of protrusions 222a and the plurality of recesses 232a act as bead forming parts.

The plurality of beads Wb are formed in the direction perpendicular to the direction of the inflow of the workpiece W in order to inhibit the inflow of the workpiece W during the drawing of the workpiece W by the upper and lower dies 22 and 23. Each of the beads Wb is formed in substantially a trapezoid when seen in a sectional view, and protrudes downward.

Figure 8:
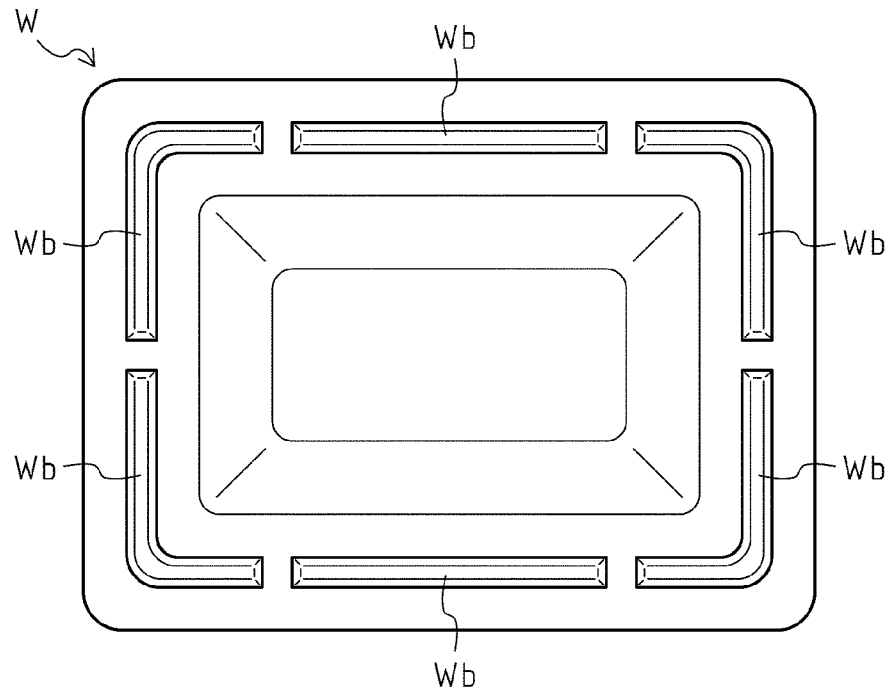
FIG. 8 shows the drawn steel sheet.

As shown in FIG. 8, the plurality of beads Wb are formed on the peripheral part of the workpiece W over the whole circumference thereof, and adjacent beads Wb are arranged at a predetermined interval. In short, the beads Wb are intermittently formed on the peripheral part of the workpiece W over the whole circumference thereof. In other words, the plurality of beads Wb are formed in a shape obtained by removing a plurality of parts of one bead which is continuously formed to follow the whole circumference of the peripheral part of the workpiece W from a predetermined position of the peripheral part to the predetermined position.

In the present embodiment, the workpiece W is formed in substantially a rectangle when seen in a plan view, and six beads Wb are formed in substantially a rectangle, when seen in a plan view, over the whole circumference of the peripheral part of the workpiece W.

The cutting step S3 is a step for cutting the workpiece W, using the cutting device 3, which has undergone the drawing step S2.

In the cutting step S3, the unnecessary part of the peripheral part of the workpiece W is removed (trimmed) by continuously punching the workpiece W with the nibbler 33 of the cutting device 3 while moving the nibbler 33 from any position of the periphery of the workpiece W having undergone the drawing step S2.

The unnecessary part of the peripheral part of the workpiece W includes a part where the plurality of beads Wb are formed. Therefore, when cutting the unnecessary part of the peripheral part of the workpiece W, it is necessary to move the nibbler 33 to a part of the workpiece W situated inward from the plurality of beads Wb.

When the workpiece W is cut by the nibbler 33 over the bead Wb, the case 331 and the die 334 come in contact with the bead Wb because of the structure of the nibbler 33. Therefore, it is difficult to move the nibbler 33 to the part of the workpiece W situated inward from the plurality of beads Wb.

However, in the step S1, the plurality of beads Wb are formed at predetermined intervals. In other words, a gap is formed between adjacent beads Wb.

Figure 9:
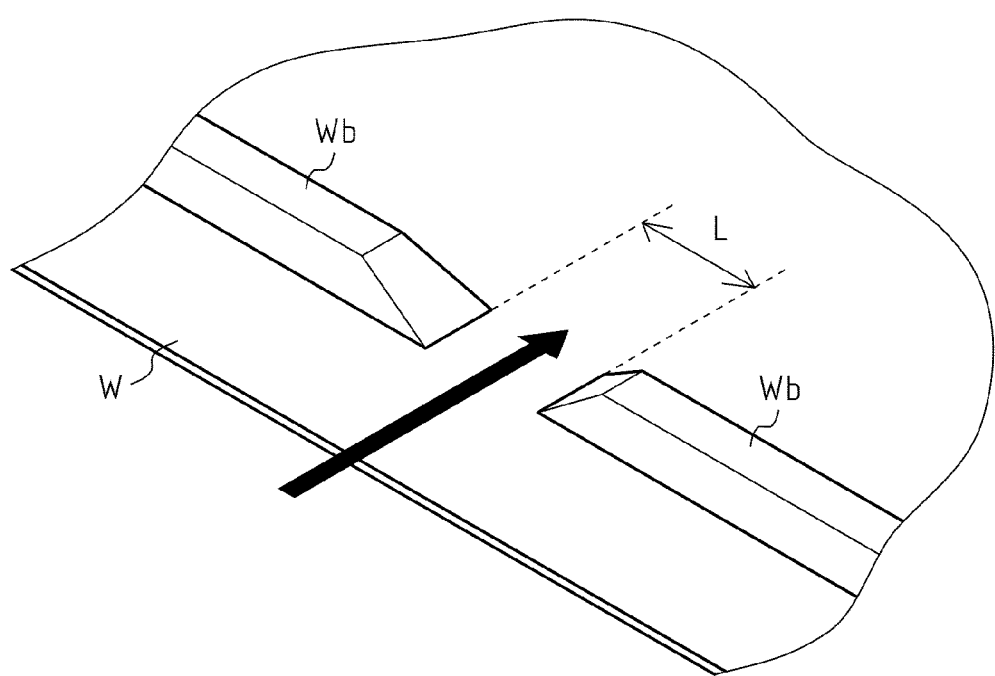
FIG. 9 shows a gap between adjacent beads.

As shown in FIG. 9, this makes it possible to move the nibbler 33 to the part of the workpiece W situated inward from the plurality of beads Wb through the gap between the beads Wb.

In this manner, the nibbler 33 is moved to the part of the workpiece W situated inward from the plurality of beads Wb through the gap between the beads Wb. After that, the nibbler 33 is moved over the whole circumference of the peripheral part of the workpiece W, thus enabling to cut out the unnecessary part of the peripheral part of the workpiece W.

An interval (see L in FIG. 9) between adjacent beads Wb is such a value that the nibbler 33 can pass through the gap between the adjacent beads Wb.

It is desirable that the gap between the adjacent beads Wb is formed at a position where the gap has an adverse effect on the prevention of the inflow of the workpiece W in the drawing step S2.

Preferably, each part of the workpiece W having one bead Wb is cut out when the workpiece W is trimmed.

Figure 10:
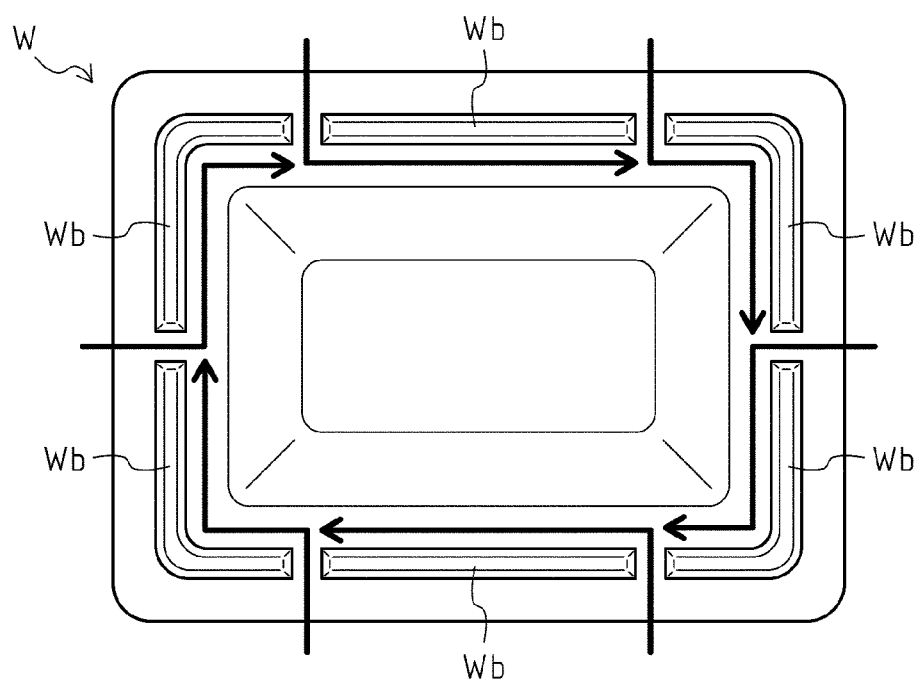
FIG. 10 shows paths through which the nibblers move.

As shown in FIG. 10, six beads Wb are formed on the workpiece W in the present embodiment. Therefore, the unnecessary part of the peripheral part of the workpiece W is preferably divided into six pieces and cut out.

This makes it possible to provide a decrease in size of the unnecessary part having been cut out, and consequently to easily dispose of waste.

Note that the arrows in FIG. 10 represent paths through which the nibblers 33 are moved.

Moreover, the unnecessary parts of the peripheral part of the workpiece W are preferably cut out by a plurality of nibblers at the same time.

In the present embodiment, the cutting device 3 is provided with the two nibblers 33. Therefore, two unnecessary parts each having one bead Wb are preferably cut out by the two nibblers 33 at the same time.

This makes it possible to trim the workpiece W in a short time.

In the present embodiment, the workpiece W is formed in substantially a rectangle when seen in a plan view, and six beads Wb are formed in substantially a rectangle, when seen in a plan view, over the whole circumference of the peripheral part of the workpiece W. However, the shapes of the workpiece W and the bead Wb, and the number of beads Wb are not limited thereto. A bead may intermittently be formed over the whole circumference of the peripheral part of a workpiece having a predetermined shape so that at least one part of the bead is absent in the workpiece.

Note that a "peripheral part" of a workpiece according to the present invention includes outer and inner peripheral parts of the workpiece. For example, in a case where the workpiece has a predetermined through hole, beads are formed on not only the outer peripheral part of the workpiece but also the part around the through hole, namely, the inner peripheral part of the workpiece.

In the present embodiment, the bead may intermittently be formed over the whole circumference of the peripheral part of the workpiece so that at least one part of the bead is absent. However, a part of the bead may at least have such a height that the nibbler moves over the bead.

Figure 11:
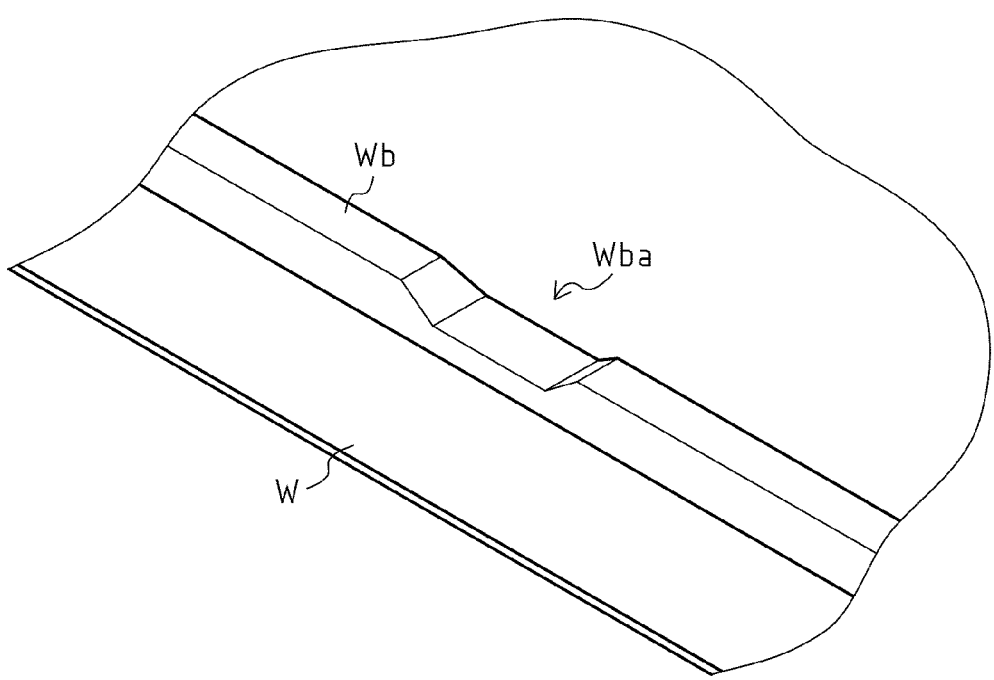
FIG. 11 shows a low part formed in the bead.

For example, as shown in FIG. 11, a low part Wba may be formed at a part of one bead Wb continuously formed. The low part Wba has such a height that the nibbler 33 moves over the bead Wb, and is lower than a part of the bead Wb other than the low part Wba.

The low part Wba has a vertical size (height) smaller than the shortest distance between the case 331 and the die 334 of the nibbler 33 (specifically, the distance between the lower end surface of the case 331 and the upper end surface of the die 334 (see FIG. 5)). In other words, the low part Wba is formed so that the punch 332 of the nibbler 33 punches the low part Wba and consequently the nibbler 33 moves over the low part Wba.

In the case of forming the low part Wba on the bead Wb, the bead Wb is continuously formed over the whole circumference of the peripheral part of the workpiece W.

This makes it possible to suitably inhibit the inflow of the workpiece W.

When the workpiece W is trimmed, the nibbler 33 is required to be moved to a part of the workpiece W situated inward from the plurality of beads Wb.

In the case of intermittently forming the bead Wb over the whole circumference of the peripheral part of the workpiece W, a gap between adjacent beads Wb corresponds to the low part Wba. In other words, in the case of intermittently forming the bead Wb over the whole circumference of the peripheral part of the workpiece W, the low part Wba is formed flush with the surface of the workpiece W.

By cutting off a bead continuously formed over the whole circumference of the peripheral part of the workpiece in at least one part of the bead, and arranging one section and the other section of the cut part at an interval in an inward-outward direction of the workpiece W, a path through which the nibbler moves to a part of the workpiece situated inward from the bead may be formed.

Figure 12:
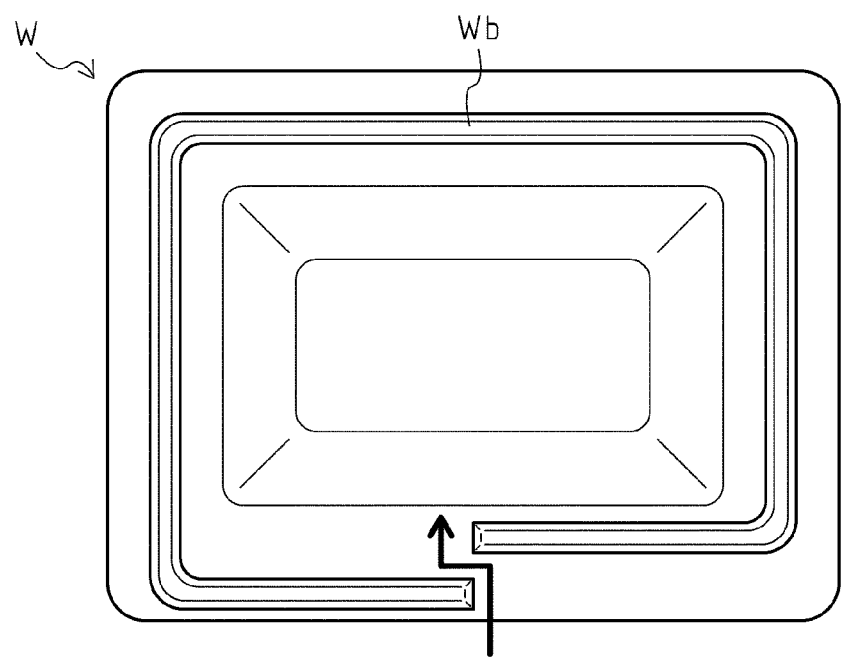
FIG. 12 shows a bead which is continuously formed on the peripheral part of the steel sheet over the whole circumference thereof so that one end and the other end of the bead are separated from each other in an inward-outward direction of the steel sheet.

For example, as shown in FIG. 12, one bead Wb may continuously be formed over the whole circumference of the peripheral part of the workpiece W so that one end and the other end of the bead Wb are separated from each other in the inward-outward direction of the workpiece W. A gap between the one end and the other end of the bead Wb is formed so that the nibbler 33 passes therethrough.

Moreover, as shown in FIG. 13, the plurality of beads Wb may be formed so that adjacent beads Wb are separated from each other in the inward-outward direction of the workpiece W.

The "inward-outward direction" of the workpiece W is a direction from the outer edge of the workpiece W toward the part of the workpiece W situated inward from the bead Wb, and is a direction which is perpendicular to a circumferential direction of the peripheral part of the workpiece W and which is parallel to the surface of the workpiece W.

Note that the arrow in FIG. 12 represents path through which the nibblers 33 are moved.

Thus, the bead continuously formed over the whole circumference of the peripheral part of the workpiece is shifted in the inward-outward direction. This makes it possible to form the path through which the nibbler moves to the part of the workpiece situated inward from the bead without an increase in the inflow of the workpiece. In other words, the bead has not a shape in which the bead is cut off to shift in the circumferential direction of the peripheral part of the workpiece but a shape in which the bead is cut off to shift in the direction of the inflow of the workpiece. Therefore, a resistance during the inflow of the workpiece is not reduced.

The bending step S4 is a step for bending the workpiece W, using the bending device 4, which has undergone the cutting step S3.

In the bending step S4, the workpiece W is bent by rolling the bending roller 43 of the bending device 4 while pressing a predetermined part of the workpiece W, using the bending roller 43, which has undergone the cutting step S3.

As mentioned above, in the step S1, the drawing step S2, the cutting step S3 and the bending step S4 are performed in order, and thereby the workpiece W is formed into a predetermined shape.

[Second embodiment]

Figure 14:
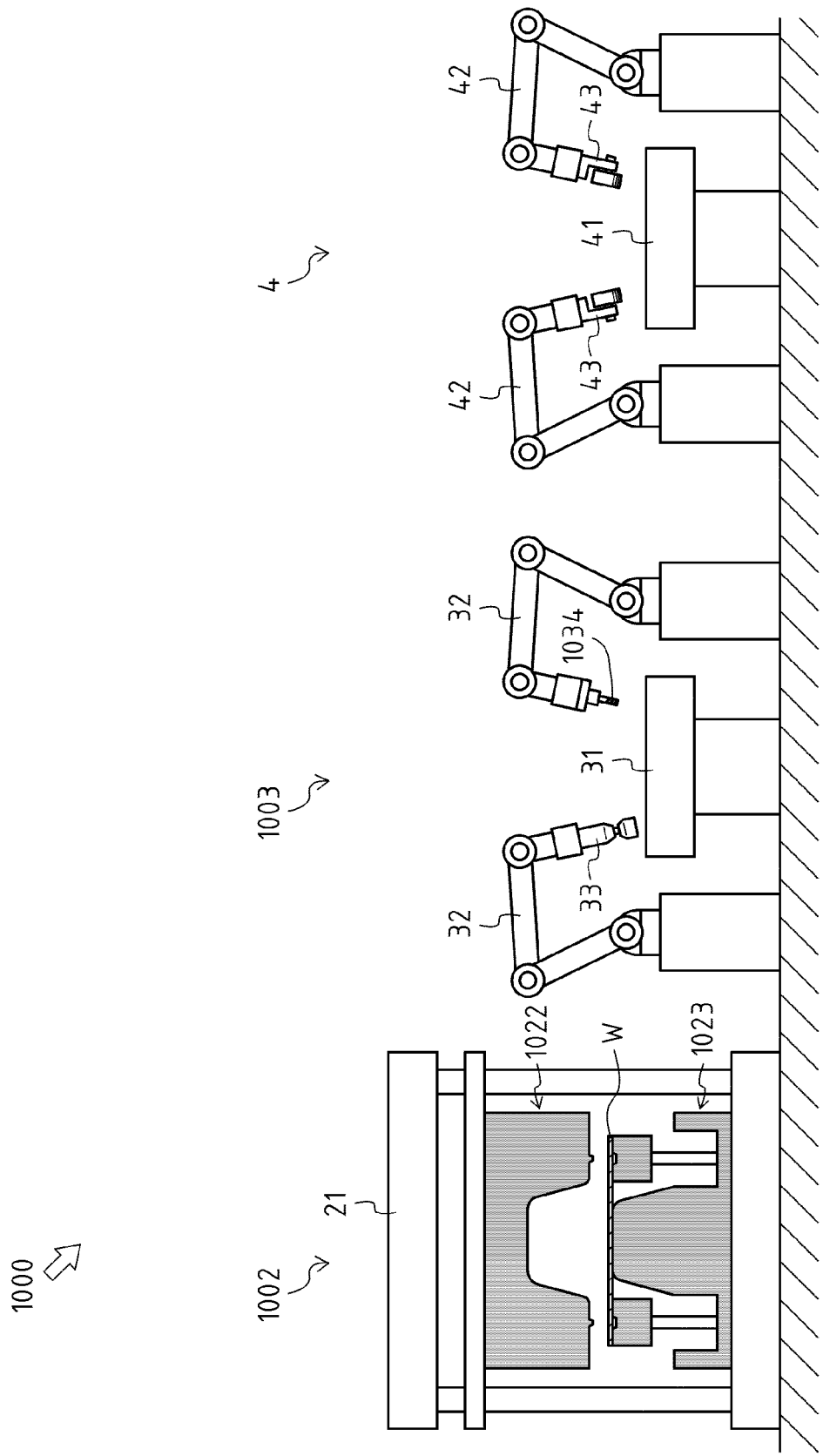
FIG. 14 shows an apparatus for working the steel sheet according to a second embodiment of the present invention.
Figure 16:
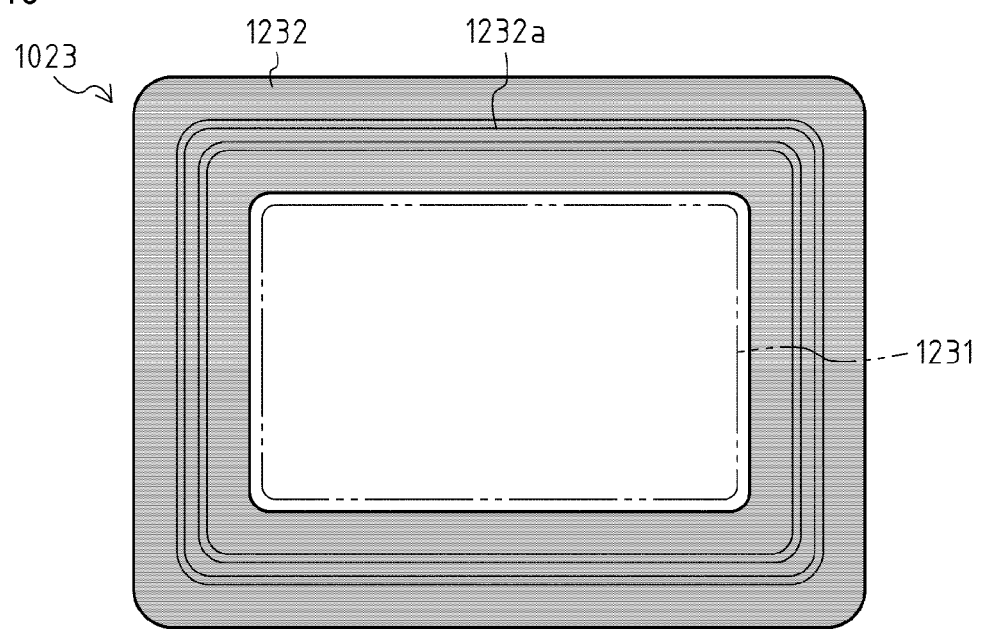
FIG. 16 is a plan view showing a recess formed on a lower die of the drawing device.

With reference to FIGS. 14 and 16, an apparatus 1001 as a second embodiment of an apparatus for working a steel sheet according to the present invention is described below.

The apparatus 1001 works the workpiece W which is a steel sheet into a predetermined shape.

For convenience, a top-bottom direction in FIG. 14 is defined as a top-bottom direction of the apparatus 1001.

Hereinafter, common parts between the apparatus 1001 and the apparatus 1 are indicated by the same reference signs, and descriptions thereof are omitted.

As shown in FIG. 14, the apparatus 1001 includes a drawing device 1002, a cutting device 1003, and the bending device 4.

The drawing device 1002 has the pressing machine 21, and upper and lower dies 1022 and 1023. The drawing device 1002 is configured to draw the workpiece W.

In the present embodiment, the upper and lower dies 1022 and 1023 are attached to the pressing machine 21.

The upper and lower dies 1022 and 1023 constitute a pair of dies attached to the pressing machine 21, and are arranged above and below the pressing machine 21, respectively. The upper and lower dies 1022 and 1023 draw the workpiece W placed therebetween when the pressing machine 21 brings the upper die 1022 into proximity with the lower die 1023.

Figure 15:
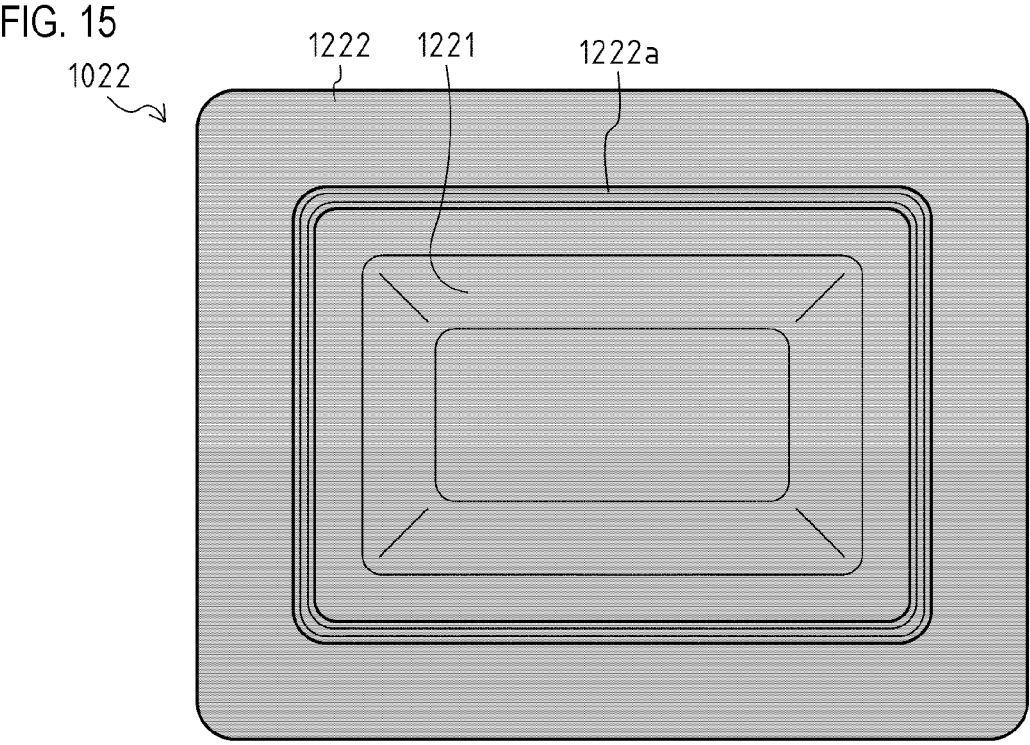
FIG. 15 is a bottom view showing a protrusion formed on an upper die of a drawing device.

As shown in FIG. 15, the upper die 1022 has a die hole 1221 and a die part 1222.

The die hole 1221 is formed so that the lower surface of the upper die 1022 is upward recessed. The die hole 1221 is formed to coincide in shape with an after-mentioned punch part 1231 of the lower die 1023.

The die part 1222, together with the punch part 1231 of the lower die 1023, draws the workpiece W. The die part 1222 is formed to surround the die hole 1221. In other words, the die part 1222 corresponds to the part of the upper die 1022 where the die hole 1221 is not formed.

On the lower surface of the die part 1222, a wrinkle-preventing surface for holding the peripheral part of the workpiece W is formed. On the wrinkle-preventing surface of the die part 1222, a protrusion 1222a is formed which inhibits the inflow (movement toward the die hole 1221) of the workpiece W during the drawing of the workpiece W.

The protrusion 1222a is formed in substantially a trapezoid when seen in a sectional view, and protrudes downward. The protrusion 1222a is continuously formed to surround the die hole 1221 along the shape of the die hole 1221. Specifically, the protrusion 1222a is formed in a ring to circle the die hole 1221 from a predetermined position of the wrinkle-preventing surface of the die part 1222 to the predetermined position.

In the present embodiment, the die hole 1221 is formed in substantially a rectangle when seen in a bottom view, and the protrusion 1222a is formed in substantially a rectangle when seen in a bottom view to surround the die hole 1221.

As shown in FIG. 16, the lower die 1023 has the punch part 1231 and a blank holder 1232.

The punch part 1231 is formed to protrude toward the die hole 1221 of the upper die 1022. The punch part 1231 is formed to coincide in shape with the die hole 1221 of the upper die 1022. The punch part 1231, together with the die part 1222 of the upper die 1022, draws the workpiece W.

The blank holder 1232, together with the die part 1222 of the upper die 1022, holds the peripheral part of the workpiece W therebetween. The blank holder 1232 is arranged to surround the punch part 1231. In other words, a through hole through which the punch part 1231 passes is formed in the blank holder 1232 to coincide in shape with the punch part 1231 so as to come out of contact with the punch part 1231. The blank holder 1232 is upward biased by a predetermined biasing means through a plurality of cushion pins (not shown). The blank holder 1232 moves downward when load against the biasing force is applied thereto. During no application of the load, the blank holder 1232 stays at the same height as the upper surface of the punch part 1231 or above the upper surface of the punch part 1231.

The upper surface of the blank holder 1232 corresponds to the wrinkle-preventing surface of the die part 1222. On the upper surface of the blank holder 1232, a recess 1232a corresponding to the protrusion 1222a of the die part 1222 of the upper die 1022 is formed to downward cave in.

The recess 1232a is formed to coincide in shape with the protrusion 1222a. In other words, the recess 1232a is formed in substantially a trapezoid when seen in a sectional view. The recess 1232a is continuously formed to surround the through hole of the blank holder 1232 along the shape of the through hole. Specifically, the recess 1232a is formed in a ring to circle the through hole from a predetermined position of the upper surface of the blank holder 1232 to the predetermined position.

In the present embodiment, the punch part 1231 and the through hole of the blank holder 1232 are each formed in substantially a rectangle, and the recess 1232a is formed in substantially a rectangle when seen in a plan view to surround the through hole.

As shown in FIG. 14, the cutting device 1003 has the lower die 31, the two robots 32, the nibbler 33, and an end mill 1034. The cutting device 1003 cuts the workpiece W drawn by the drawing device 1002.

In the present embodiment, the nibbler 33 is attached to one of the robots 32, and the end mill 1034 is attached to the other of the robots 32.

The end mill 1034 is configured to mill the workpiece W.

Figure 17:
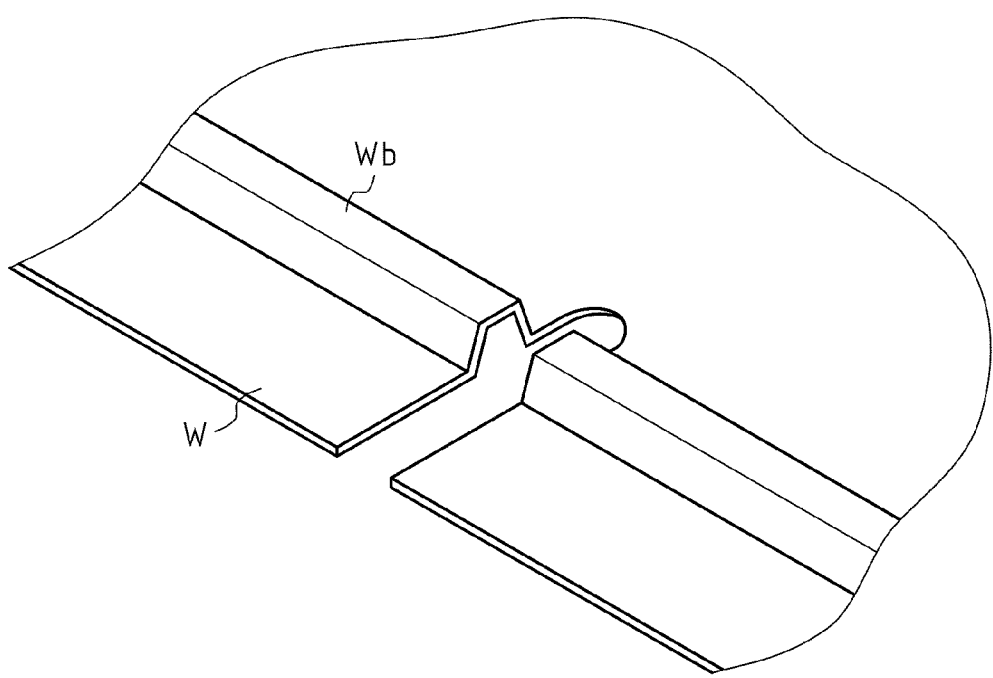
FIG. 17 shows the steel sheet milled from a periphery to a part situated inward from the bead.
Figure 19:
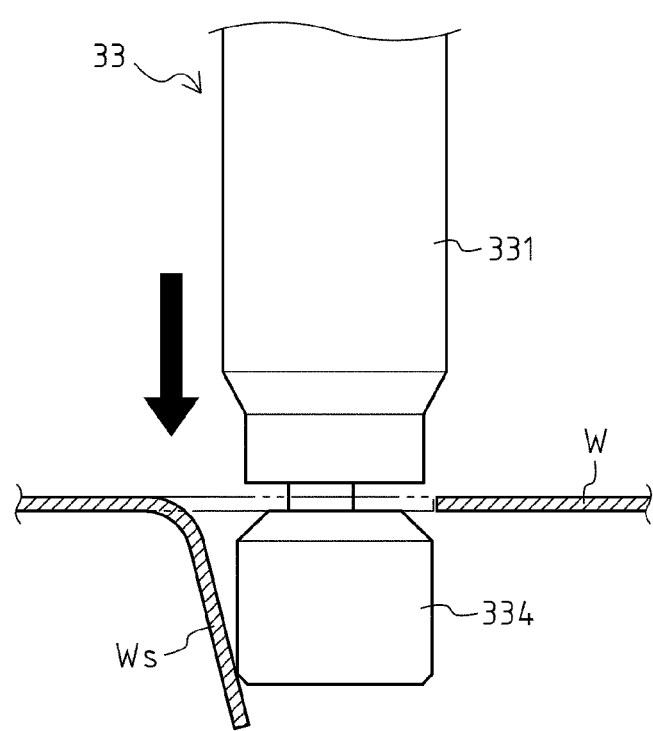
FIG. 19 shows how to bend the slit part downward with the nibbler.

With reference to FIGS. 17 and 19, a step S1001 for working a steel sheet using the apparatus 1001 is described below.

The step S1001 includes a drawing step S1002, a cutting step S1003, and a bending step S1004.

The drawing step S1002 is a step for drawing the workpiece W with the drawing device 1002.

Details as to how the drawing device 1002 draws the workpiece W are omitted because the drawing device 1002 draws the workpiece W substantially similarly to the drawing device 2 of the apparatus 1.

As mentioned previously, the protrusion 1222a and the recess 1232a are formed on the die part 1222 and the blank holder 1232, respectively (see FIGS. 15 and 16).

Therefore, when the peripheral part of the workpiece W is pressed by the die part 1222 and the blank holder 1232, the bead Wb protruding downward is formed on the peripheral part of the workpiece W to coincide in shape with the protrusion 1222a and the recess 1232a.

Thus, the protrusion 1222a and the recess 1232a act as bead forming parts.

In the present embodiment, the bead Wb is continuously formed on the peripheral part of the workpiece W over the whole circumference thereof. Specifically, the bead Wb is formed in a ring to follow the whole circumference of the peripheral part of the workpiece W from a predetermined position of the peripheral part to the predetermined position.

The cutting step S1003 is a step for cutting the workpiece W, using the cutting device 1003, which has undergone the drawing step S1002.

As mentioned previously, in the present embodiment, the bead Wb is continuously formed in a ring over the whole circumference of the peripheral part of the workpiece W.

Therefore, unlike the workpiece W having undergone the drawing step S2 of the step S1, the workpiece W having undergone the drawing step S1002 has no path (hereinafter, referred to as an "approaching path for the nibbler 33") through which the nibbler 33 moves to a part of the workpiece W situated inward from the bead Wb.

In the cutting step S1003, the approaching path for the nibbler 33 in the workpiece W is formed by the end mill 1034 of the cutting device 1003.

Specifically, as shown in FIG. 17, the workpiece W is milled by the end mill 1034 from the periphery of the workpiece W to the part of the workpiece W situated inward from the bead Wb. In this regard, the milling is performed so that a milled part of the workpiece W has such a size that the nibbler 33 enters the milled part.

The nibbler 33 is entered into the milled part of the workpiece W, and then the workpiece W is cut by the nibbler 33 from the part of the workpiece W situated inward from the bead Wb. This makes it possible to cut out the unnecessary part of the peripheral part of the workpiece W.

The number of approaching path for the nibbler 33 in the workpiece W is not limited as long as at least one approaching path is formed.

In the present embodiment, the end mill 1034 is attached to the other of the robots 32 of the cutting device 1003. However, a working tool such as a laser cutter may be attached to the other of the robots 32 instead of the end mill 1034 as long as the workpiece W is milled from the periphery of the workpiece W to the part of the workpiece W situated inward from the bead Wb to form the approaching path for the nibbler 33.

In the present embodiment, the workpiece W is milled from the periphery of the workpiece W to the part of the workpiece W situated inward from the bead Wb to form the approaching path for the nibbler 33. However, a method for moving the nibbler 33 to the part of the workpiece W situated inward from the bead Wb is not limited thereto.

For example, the approaching path for the nibbler 33 may be formed as follows: a working tool such as a roller is attached to the other of the robots 32 of the cutting device 1003 instead of the end mill 1034, and then at least one part of the bead Wb is pressed by the working tool to reduce the height thereof to such a height that the nibbler 33 moves over the bead Wb (to a height smaller than the shortest distance between the case 331 and the die 334 of the nibbler 33).

Figure 18:
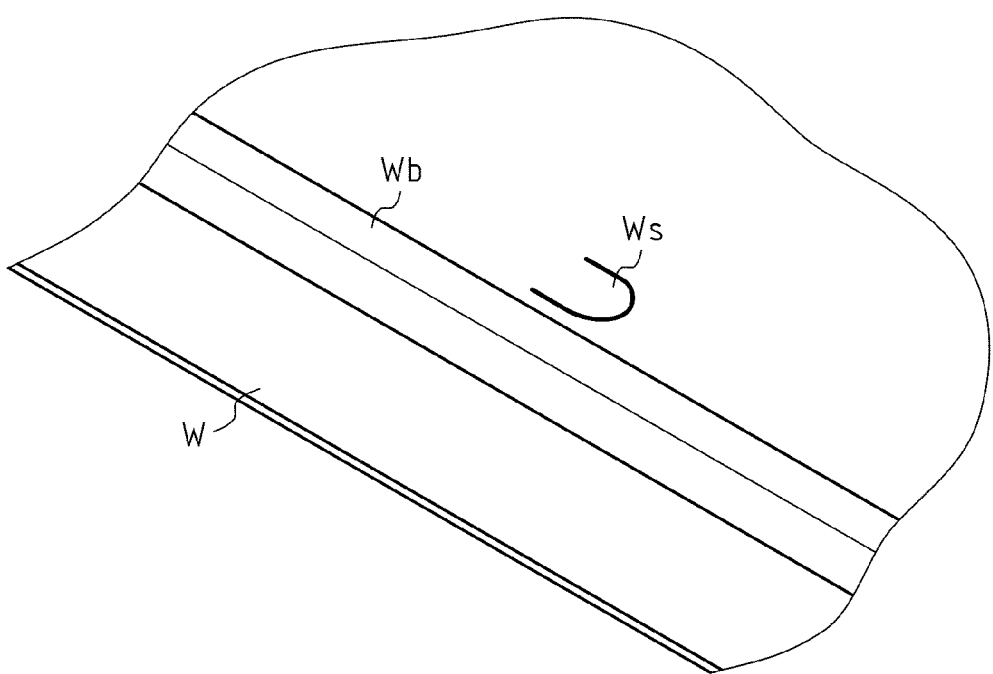
FIG. 18 shows the steel sheet where a slit part is formed on a part thereof situated inward from the bead.

As shown in FIG. 18, a slit part Ws acting as the approaching path for the nibbler 33 may be formed by providing a slit penetrating through the workpiece W in the part of the workpiece W situated inward from the bead Wb.

The slit part Ws is formed by providing substantially a U-shaped slit in the part of the workpiece W situated inward from the bead Wb. Therefore, only a part of the slit part Ws is not cut out from the workpiece W.

As shown in FIG. 19, when the slit part Ws is pressed by the nibbler 33 from above, the slit part Ws is downward bent. As a result, a through hole into which the nibbler 33 is inserted is formed in the workpiece W.

The nibbler 33 is inserted into the through hole, and then the workpiece W is cut by the nibbler 33 from the through hole. This makes it possible to cut out the unnecessary part of the peripheral part of the workpiece W.

The number of slit part Ws is not limited as long as at least one slit part Ws is formed.

In the present embodiment, the slit part Ws is formed by providing substantially the U-shaped slit in the workpiece W. However, the shape of the slit part Ws is not limited thereto.

Moreover, a method for forming the slit part Ws is not limited, but the slit part Ws is preferably formed in the drawing step S1002.

For example, it is preferable that a blade for forming substantially a U-shaped slit in the workpiece W is provided to the upper die 1022 or the lower die 1023, and the slit part Ws is formed at the same time as the drawing of the workpiece W.

This makes it possible to prevent an increase in a time required for the step S1001 without separately forming the slit part Ws.

INDUSTRIAL APPLICABILITY

The present invention is applicable to a method and an apparatus for working a steel sheet into a predetermined shape.

REFERENCE SIGNS LIST

1: apparatus for working steel sheet
2: drawing device
21: pressing machine
22: upper die
221: die hole
222: die part
222a: protrusion
23: lower die
231: punch part
232: blank holder
232a: recess
3: cutting device
31: lower die
32: robot
33: nibbler
331: case
332: punch
333: supporting part
334: die
334a: die hole
334b: ejecting hole
335: driving part
4: bending device
41: lower die
42: robot
43: bending roller

What is claimed:

1. A method for working a steel sheet into a predetermined shape, comprising:
a drawing step for drawing the steel sheet using at least one pair of dies; and
a cutting step for cutting the steel sheet drawn in the drawing step using at least one nibbler, wherein
the nibbler has a cylindrical case, a punch housed in the case, which reciprocates in a top-bottom direction to punch the steel sheet, and a die arranged below the case so as to be on the opposite side of the case across the steel sheet, the die having a die hole into which the punch enters, and an ejecting hole communicating with the die hole, through which a scrap punched from the steel sheet is ejected, and in the cutting step, while moving the nibbler, the steel sheet fed between the case and the die is continuously punched by the punch to cut the steel sheet, wherein in the drawing step, a bead protruding toward a side where one of both surfaces of the steel sheet is situated is formed in a ring on a peripheral part of the steel sheet over the whole circumference of the peripheral part, a low part having a height smaller than the shortest distance between the case and the die of the nibbler is formed in at least one part of the bead, in the cutting step, a part of the peripheral part including the bead is cut out by moving the nibbler over the low part from a periphery of the steel sheet to a part of the steel sheet situated inward from the bead and changing the cutting direction of the nibbler.

2. The method according to claim 1, wherein the low part of the bead is formed flush with the surface of the steel sheet.

3. The method according to claim 1, further comprising: a bending step for bending the steel sheet cut in the cutting step.

4. A method for working a steel sheet into a predetermined shape, comprising:

a drawing step for drawing the steel sheet using at least one pair of dies; and a cutting step for cutting the steel sheet drawn in the drawing step using at least one nibbler, wherein the nibbler has a cylindrical case, a punch housed in the case, which reciprocates in a top-bottom direction to punch the steel sheet, and a die arranged below the case so as to be on the opposite side of the case across the steel sheet, the die having a die hole into which the punch enters, and an ejecting hole communicating with the die hole, through which a scrap punched from the steel sheet is ejected, and in the cutting step, while moving the nibbler, the steel sheet fed between the case and the die is continuously punched by the punch to cut the steel sheet, wherein in the drawing step, a bead protruding toward a side where one of both surfaces of the steel sheet is situated is formed on a peripheral part of the steel sheet over the whole circumference of the peripheral part, the bead is cut off in at least one part thereof, one section and the other section of the part where the bead is cut off is arranged at an interval in an inward-outward direction of the steel sheet to form a gap therebetween through which the nibbler passes, and in the cutting step, the nibbler is moved to a part of the steel sheet situated inward from the bead through the gap to cut out a part of the peripheral part including the bead.

5. A method for working a steel sheet into a predetermined shape, comprising:

a drawing step for drawing the steel sheet using at least one pair of dies; and a cutting step for cutting the steel sheet drawn in the drawing step using at least one nibbler, wherein the nibbler has a cylindrical case, a punch housed in the case, which reciprocates in a top-bottom direction to punch the steel sheet, and a die arranged below the case so as to be on the opposite side of the case across the steel sheet, the die having a die hole into which the punch enters, and an ejecting hole communicating with the die hole, through which a scrap punched from the steel sheet is ejected, and in the cutting step, while moving the nibbler, the steel sheet fed between the case and the die is continuously punched by the punch to cut the steel sheet, wherein in the drawing step, a bead protruding toward a side where one of both surfaces of the steel sheet is situated is continuously formed in a ring on a peripheral part of the steel sheet over the whole circumference of the peripheral part, in the cutting step, the steel sheet is milled from a periphery of the steel sheet to a part of the steel sheet situated inward from the bead, and then the nibbler is entered into the milled part of the steel sheet to cut out a part of the peripheral part including the bead.

6. A method for working a steel sheet into a predetermined shape, comprising:

a drawing step for drawing the steel sheet using at least one pair of dies; and a cutting step for cutting the steel sheet drawn in the drawing step using at least one nibbler, wherein the nibbler has a cylindrical case, a punch housed in the case, which reciprocates in a top-bottom direction to punch the steel sheet, and a die arranged below the case so as to be on the opposite side of the case across the steel sheet, the die having a die hole into which the punch enters, and an ejecting hole communicating with the die hole, through which a scrap punched from the steel sheet is ejected, and in the cutting step, while moving the nibbler, the steel sheet fed between the case and the die is continuously punched by the punch to cut the steel sheet, wherein in the drawing step, a bead protruding toward a side where one of both surfaces of the steel sheet is situated is continuously formed in a ring on a peripheral part of the steel sheet over the whole circumference of the peripheral part, in the cutting step, at least one of the bead is pressed to make a height thereof smaller than the shortest distance between the case and the die of the nibbler, and then the nibbler is moved over the pressed part of the bead from a periphery of the steel sheet to a part of the steel sheet situated inward from the bead to cut out a part of the peripheral part including the bead.

7. A method for working a steel sheet into a predetermined shape, comprising:

a drawing step for drawing the steel sheet using at least one pair of dies; and a cutting step for cutting the steel sheet drawn in the drawing step using at least one nibbler, wherein the nibbler has a cylindrical case, a punch housed in the case, which reciprocates in a top-bottom direction to punch the steel sheet, and a die arranged below the case so as to be on the opposite side of the case across the steel sheet, the die having a die hole into which the punch enters, and an ejecting hole communicating with the die hole, through which a scrap punched from the steel sheet is ejected, and in the cutting step, while moving the nibbler, the steel sheet fed between the case and the die is continuously punched by the punch to cut the steel sheet, wherein in the drawing step, a bead protruding toward a side where one of both surfaces of the steel sheet is situated is continuously formed in a ring on a peripheral part of the steel sheet over the whole circumference of the peripheral part, and a slit part to be bent toward a side where one of both the surfaces of the steel sheet is situated is formed by providing a slit penetrating through the steel sheet in the part of the steel sheet situated inward from the bead, in the cutting step, a through hole into which the nibbler is inserted is formed in the steel sheet by bending the slit part toward a side where one of both the surfaces of the steel sheet is situated, and then the nibbler is inserted into the through hole to cut out a part of the peripheral part including the bead.

8. An apparatus for working a steel sheet into a predetermined shape, comprising:

a drawing device having at least one pair of dies, which draws the steel sheet;

a cutting device having at least one nibbler, which cuts the steel sheet drawn by the drawing device; and a bending device which bends the steel sheet cut by the cutting device, wherein the nibbler includes:

a cylindrical case;

a punch housed in the case, which reciprocates in a top-bottom direction to punch the steel sheet; and a die arranged below the case so as to be on the opposite side of the case across the steel sheet, the die having a die hole into which the punch enters, and an ejecting hole communicating with the die hole, through which a scrap punched from the steel sheet is ejected, and the nibbler makes the punch continuously punch the steel sheet fed between the case and the die while moving, thereby cutting the steel sheet, wherein a bead protruding toward a side where one of both surfaces of the steel sheet is formed in a ring on a peripheral part of the steel sheet over the whole circumference of the peripheral part, a low part having a height smaller than the shortest distance between the case and the die of the nibbler is formed in at least one part of the bead, and a part of the peripheral part including the bead is cut out by moving the nibbler over the low part from a periphery of the steel sheet to a part of the steel sheet situated inward from the bead and changing the cutting direction of the nibbler.

\* \* \* \* \*